United States Patent
Harel et al.

(10) Patent No.: US 11,669,570 B2
(45) Date of Patent: Jun. 6, 2023

(54) AMORTIZED EXECUTION OF UPDATES TO A HARDENED HASH TABLE

(71) Applicant: EMC IP Holding Company LLC, Hopkinton, MA (US)

(72) Inventors: Bar Harel, Tel-Aviv (IL); Uri Shabi, Tel Mond (IL); Maor Rahamim, Ramla (IL)

(\*) Notice: Subject to any disclaimer, the term of this patent is extended or adjusted under 35 U.S.C. 154(b) by 428 days.

(21) Appl. No.: 16/669,834

(22) Filed: Oct. 31, 2019

(65) Prior Publication Data
US 2021/0133244 A1    May 6, 2021

(51) Int. Cl.
G06F 12/00     (2006.01)
G06F 13/00     (2006.01)
G06F 16/901    (2019.01)
G06F 16/23     (2019.01)

(52) U.S. Cl.
CPC .......... *G06F 16/9014* (2019.01); *G06F 16/23* (2019.01)

(58) Field of Classification Search
CPC .............................. G06F 16/9014; G06F 16/23
USPC ........................................................ 711/216
See application file for complete search history.

(56) References Cited

U.S. PATENT DOCUMENTS

| | | | | |
|---|---|---|---|---|
| 5,995,980 A * | 11/1999 | Olson | | G06F 16/273 |
| 6,760,345 B1 * | 7/2004 | Rosengard | | H04L 69/22 |
| | | | | 370/477 |
| 7,814,218 B1 * | 10/2010 | Knee | | H04L 69/18 |
| | | | | 709/230 |
| 8,862,588 B1 * | 10/2014 | Gay | | G06F 16/2272 |
| | | | | 707/741 |
| 8,880,787 B1 * | 11/2014 | Kimmel | | G06F 16/128 |
| | | | | 711/170 |
| 9,021,303 B1 * | 4/2015 | DeSouter | | G06F 11/1474 |
| | | | | 714/15 |
| 9,509,336 B1 * | 11/2016 | Henry | | H03M 7/30 |
| 2004/0083347 A1 * | 4/2004 | Parson | | G06F 16/9014 |
| | | | | 707/E17.036 |
| 2005/0240619 A1 * | 10/2005 | Altevogt | | G06F 16/319 |
| | | | | 707/999.102 |
| 2008/0120702 A1 * | 5/2008 | Hokimoto | | H04L 61/4535 |
| | | | | 726/4 |
| 2008/0177775 A1 * | 7/2008 | Kawate | | G11B 20/10 |
| | | | | 707/999.102 |
| 2008/0263044 A1 * | 10/2008 | Cantrill | | G06F 11/3636 |
| 2010/0198830 A1 * | 8/2010 | Stewart | | G06F 16/24539 |
| | | | | 707/769 |
| 2011/0225168 A1 * | 9/2011 | Burroughs | | G06F 9/3851 |
| | | | | 707/747 |
| 2011/0225391 A1 * | 9/2011 | Burroughs | | H04L 45/7453 |
| | | | | 711/216 |
| 2011/0264870 A1 * | 10/2011 | Ylonen | | G06F 12/0261 |
| | | | | 711/E12.001 |

(Continued)

*Primary Examiner* — Sheng Jen Tsai
(74) *Attorney, Agent, or Firm* — Daly, Crowley Mofford & Durkee, LLP (57) ABSTRACT

An aspect of implementing amortized execution of updates for a hash table includes aggregating, within a data structure, updates to be executed for the hash table. The aggregated updates are distributed across a plurality of chunks in the data structure. An aspect also includes sorting, within each of the chunks, the updates according to respective bucket index values associated with the updates, and iteratively executing the sorted updates across each of the chunks in the data structure.

14 Claims, 6 Drawing Sheets

(56) References Cited

U.S. PATENT DOCUMENTS

| | | | | |
|---|---|---|---|---|
| 2012/0158729 | A1* | 6/2012 | Mital | H04L 47/78 |
| | | | | 707/738 |
| 2014/0114951 | A1* | 4/2014 | Sasaki | G06F 16/2246 |
| | | | | 707/715 |
| 2014/0301549 | A1* | 10/2014 | Guleria | H04L 9/0836 |
| | | | | 380/44 |
| 2016/0147750 | A1* | 5/2016 | Blanco | G06F 16/221 |
| | | | | 707/747 |
| 2017/0063992 | A1* | 3/2017 | Baek | G06F 12/023 |
| 2017/0153847 | A1* | 6/2017 | Harari | G06F 3/0644 |
| 2017/0178600 | A1* | 6/2017 | Wei | G06F 12/1018 |
| 2017/0255708 | A1* | 9/2017 | Cho | G06F 16/22 |
| 2017/0255709 | A1* | 9/2017 | Cho | G06F 16/28 |
| 2019/0102256 | A1* | 4/2019 | Murphy | G06F 11/1451 |
| 2020/0034440 | A1* | 1/2020 | Schneider | G06F 16/2255 |
| 2020/0117546 | A1* | 4/2020 | Wong | G06F 16/137 |
| 2020/0242095 | A1* | 7/2020 | Malik | G06F 16/245 |
| 2021/0029036 | A1* | 1/2021 | Ghanwani | H04L 12/4641 |

* cited by examiner

AMORTIZED EXECUTION OF UPDATES TO A HARDENED HASH TABLE

BACKGROUND

Some storage systems may need to harden data structures into non-volatile memory block devices (e.g., HHD and SSD). Generally, storage systems performing a simple read-modify-write operation are non-atomic (e.g., a simple read-modify-write operation is RAID over multiple disks (each device may only provide atomicity in its own native block size).

When performing these read-modify-write actions, amortization and write amplification, as well as write latency, need to be taken into consideration. It is common for many storage systems to process updates using certain techniques in order to increase amortization.

SUMMARY

This Summary is provided to introduce a selection of concepts in a simplified form that are further described herein the Detailed description. This summary is not intended to identify key features or essential features of the claimed subject matter, nor is it intended to be used to limit the scope of the claimed subject matter.

One aspect may provide a method for implementing amortized execution of updates to a hardened hash table. The method includes aggregating, within a data structure, updates to be executed for the hash table. The aggregated updates are distributed across a plurality of chunks in the data structure. The method also includes sorting, within each of the chunks, the updates according to respective bucket index values associated with the updates, and iteratively executing the sorted updates across each of the chunks in the data structure.

Another aspect may provide a system for implementing amortized execution of updates to a hardened hash table. The system includes a memory having computer-executable instructions and a processor that executes the computer-executable instructions. When executed by the processor, the computer-executable instructions cause the processor to perform operations. The operations include aggregating, within a data structure, updates to be executed for the hash table. The aggregated updates are distributed across a plurality of chunks in the data structure. The operations also include sorting, within each of the chunks, the updates according to respective bucket index values associated with the updates, and iteratively executing the sorted updates across each of the chunks in the data structure.

A further aspect may provide a computer program product for implementing amortized execution of updates to a hardened hash table. The computer program product is embodied on a non-transitory computer readable medium. The computer program product includes instructions that, when executed by a computer, causes the computer to perform operations. The operations include aggregating, within a data structure, updates to be executed for the hash table. The aggregated updates are distributed across a plurality of chunks in the data structure. The operations also include sorting, within each of the chunks, the updates according to respective bucket index values associated with the updates, and iteratively executing the sorted updates across each of the chunks in the data structure.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

System Overview:

In some embodiments, the present disclosure may be embodied as a method, system, or computer program product. Accordingly, in some implementations, the embodiments may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some embodiments, the present disclosure may take the form of a computer program product on a computer-usable storage medium having computer-usable program code embodied in the medium.

In some embodiments, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium may even be a suitable medium upon which the program is stored, scanned, compiled, interpreted, or otherwise processed in a suitable manner, if necessary, and then stored in a computer memory. In the context of the embodiments described herein, a computer-usable or computer-readable storage medium may be any tangible medium that can contain or store a program for use by or in connection with the instruction execution system, apparatus, or device.

In some embodiments, a computer readable signal medium may include a propagated data signal with computer readable program code embodied therein, for example, in baseband or as part of a carrier wave. In some embodiments, such a propagated signal may take any of a variety of forms, including, but not limited to, electro-magnetic, optical, or any suitable combination thereof. In some embodiments, the computer readable program code may be transmitted using any appropriate medium, including but not limited to the internet, wireline, optical fiber cable, RF, etc. In some embodiments, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C-HF or the like. Java® and all Java-based trademarks and logos are trademarks or registered trademarks of Oracle and/or its affiliates. However, the computer program code for carrying out operations of the embodiments may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the embodiments.

In some embodiments, the flowcharts and block diagrams in the figures illustrate the architecture, functionality, and operation of possible implementations of apparatus (systems), methods and computer program products according to various implementations described herein. Each block in the flowcharts and/or block diagrams, and combinations of blocks in the flowcharts and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowcharts and/or block diagram block or blocks or combinations thereof. It should be noted that, in some embodiments, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some embodiments, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some embodiments, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
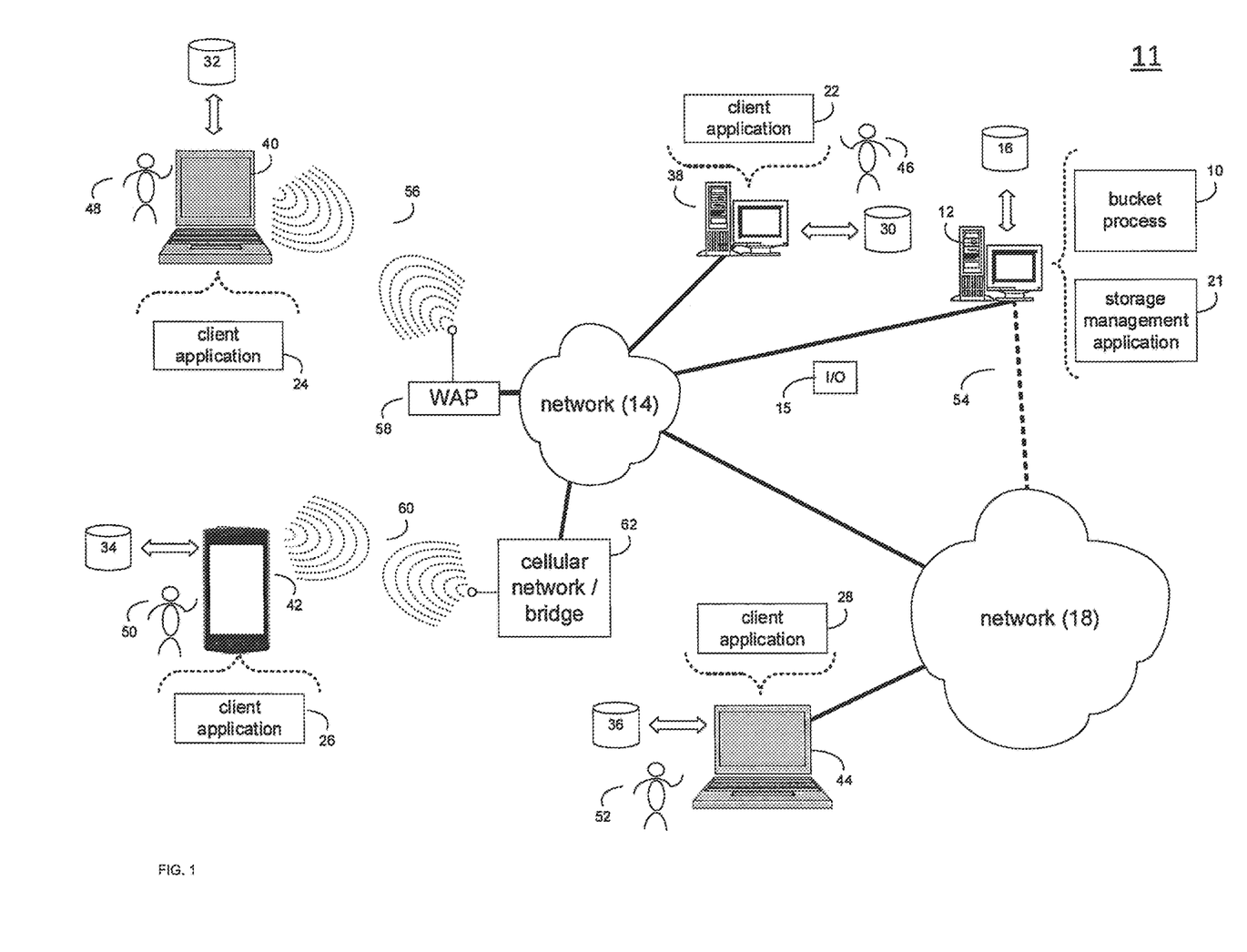
FIG. 1 is an example diagrammatic view of a distributed computing system according to one or more embodiments.

Referring now to FIG. 1, there is shown a distributed computing system 11 for implementing amortized execution of updates over a hardened hash table including a table hardening process 10 that may reside on and may be executed by a computer (e.g., computer 12), which may be connected to a network (e.g., network 14)(e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). A SAN may include one or more of the client electronic devices, including a RAID device and a NAS system. In some embodiments, each of the aforementioned elements may be generally described as a computing device. In certain embodiments, a computing device may be a physical or virtual device. In many embodiments, a computing device may be any device capable of performing operations, such as a dedicated processor, a portion of a processor, a virtual processor, a portion of a virtual processor, portion of a virtual device, or a virtual device. In some embodiments, a processor may be a physical processor or a virtual processor. In some embodiments, a virtual processor may correspond to one or more parts of one or more physical processors. In some embodiments, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some embodiments, as will be discussed below in greater detail, a table hardening process, such as the table hardening process 10 of FIG. 1, may store data in a bucket of a plurality of buckets. Buckets may be stored in various storage devices. A data structure is created for aggregating updates to data for hardening on a hash table and is described further herein.

In some embodiments, the instruction sets and subroutines of table hardening process 10, which may be stored on storage device, such as storage device 16, coupled to computer 12, may be executed by one or more processors and one or more memory architectures included within computer 12. In addition, the storage device 16 may also store hash tables 70 that are hardened according to the embodiments described herein. In some embodiments, storage device 16 may include but is not limited to: a hard disk drive; all forms of flash memory storage devices; a tape drive; an optical drive; a RAID array (or other array); a random access memory (RAM); a read-only memory (ROM); or combination thereof. In some embodiments, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some embodiments, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some embodiments, computer 12 may include a data store, such as a database (e.g., relational database, object-oriented database, triplestore database, etc.) and may be located within any suitable memory location, such as storage device 16 coupled to computer 12. In some embodiments, data, metadata, information, etc. described herein may be stored in the data store. In some embodiments, computer 12 may utilize any known database management system such as, but not limited to, DB2, in order to provide multi-user access to one or more databases, such as the above noted relational database. In some embodiments, the data store may also be a custom database, such as, for example, a flat file database or an XML database. In some embodiments, any other form(s) of a data storage structure and/or organization may also be used. In some embodiments, table hardening process 10 may be a component of the data store, a standalone application that interfaces with the above noted data store and/or an applet that is accessed via client applications 22, 24, 26, 28. In some embodiments, the above noted data store may be, in whole or in part, distributed in a cloud computing topology. In this way, computer 12 and storage device 16 may refer to multiple devices, which may also be distributed throughout the network(s).

In some embodiments, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like).

In some embodiments, table hardening process 10 and/or storage management application 21 may be accessed via one or more of client applications 22, 24, 26, 28. In some embodiments, table hardening process 10 may be a standalone application, or may be an applet, application, script, or extension that may interact with and/or be executed within storage management application 21, a component of storage management application 21, and/or one or more of client applications 22, 24, 26, 28. In some embodiments, storage management application 21 may be a standalone application, or may be an applet, application, script, or extension that may interact with and/or be executed within table hardening process 10, a component of table hardening process 10, and/or one or more of client applications 22, 24, 26, 28.

In some embodiments, one or more of client applications 22, 24, 26, 28 may be a standalone application, or may be an applet, application, script, or extension that may interact with and/or be executed within and/or be a component of table hardening process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some embodiments, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android', Apple® iOS®, Mac® OS X®; Red Hat® Linux®, Windows® Mobile, Chrome OS, Blackberry OS, Fire OS, or a custom operating system.

In some embodiments, one or more of client applications 22, 24, 26, 28 may be configured to effectuate some or all of the functionality of table hardening process 10 (and vice versa). Accordingly, in some embodiments, table hardening process 10 may be a purely server-side application, a purely client-side application, or a hybrid server-side/client-side application that is cooperatively executed by one or more of client applications 22, 24, 26, 28 and/or table hardening process 10.

In some embodiments, one or more of client applications 22, 24, 26, 28 may be configured to effectuate some or all of the functionality of storage management application 21 (and vice versa). Accordingly, in some embodiments, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, table hardening process 10, and storage management application 21, taken singly or in any combination, may effectuate some or all of the same functionality, any description of effectuating such functionality via one or more of client applications 22, 24, 26, 28, table hardening process 10, storage management application 21, or combination thereof, and any described interaction(s) between one or more of client applications 22, 24, 26, 28, table hardening process 10, storage management application 21, or combination thereof to effectuate such functionality, should be taken as an example only and not to limit the scope of the embodiments herein.

In some embodiments, one or more of users 46, 48, 50, 52 may access computer 12 and table hardening process 10 (e.g., using one or more of client electronic devices 38, 40, 42, 44) directly through network 14 or through secondary network 18. Further, computer 12 may be connected to network 14 through secondary network 18, as illustrated with phantom link line 54. Table hardening process 10 may include one or more user interfaces, such as browsers and textual or graphical user interfaces, through which users 46, 48, 50, 52 may access table hardening process 10.

In some embodiments, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some embodiments, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some embodiments, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
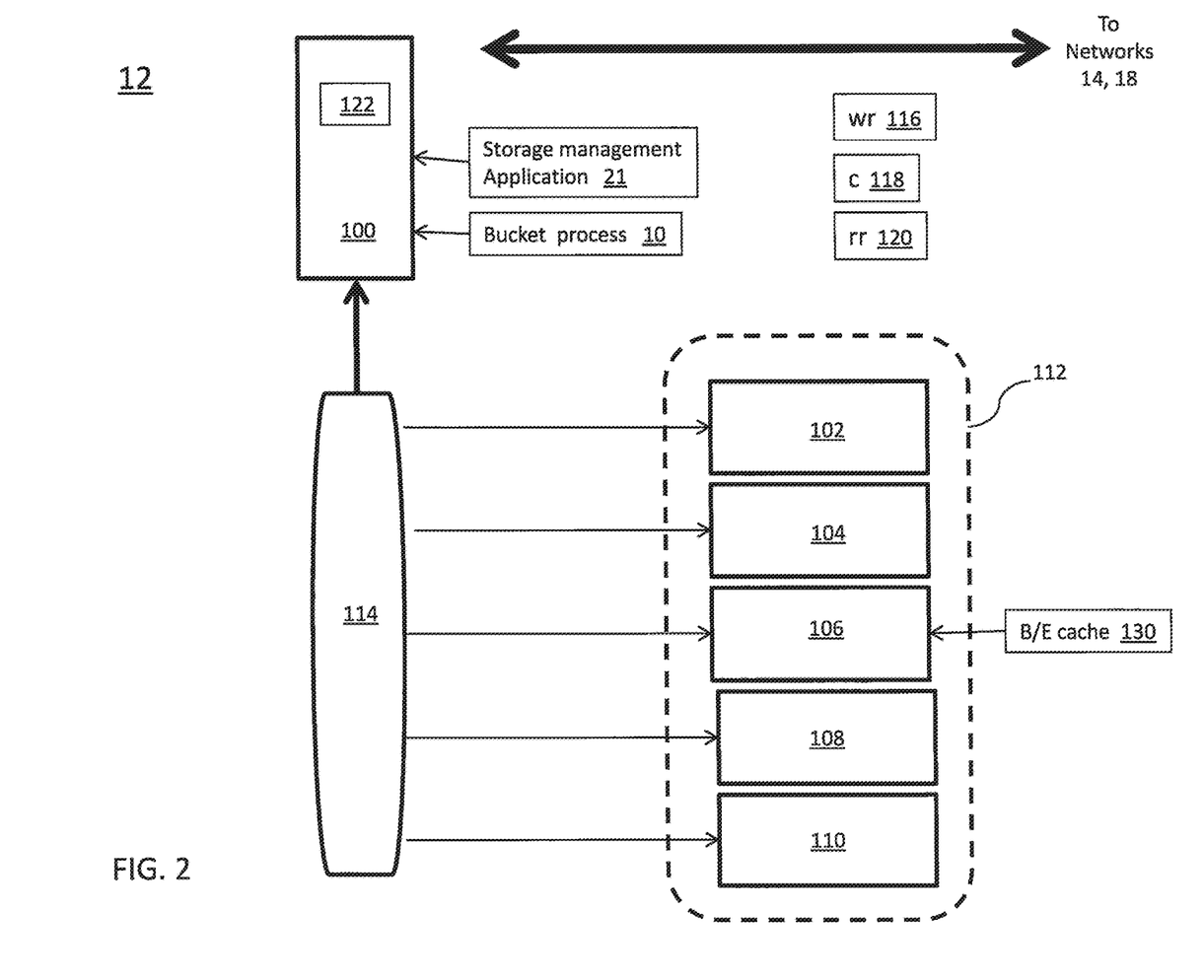
FIG. 2 is an example diagrammatic view of a storage system of FIG. 1 according to one or more embodiments.
Figure 3:
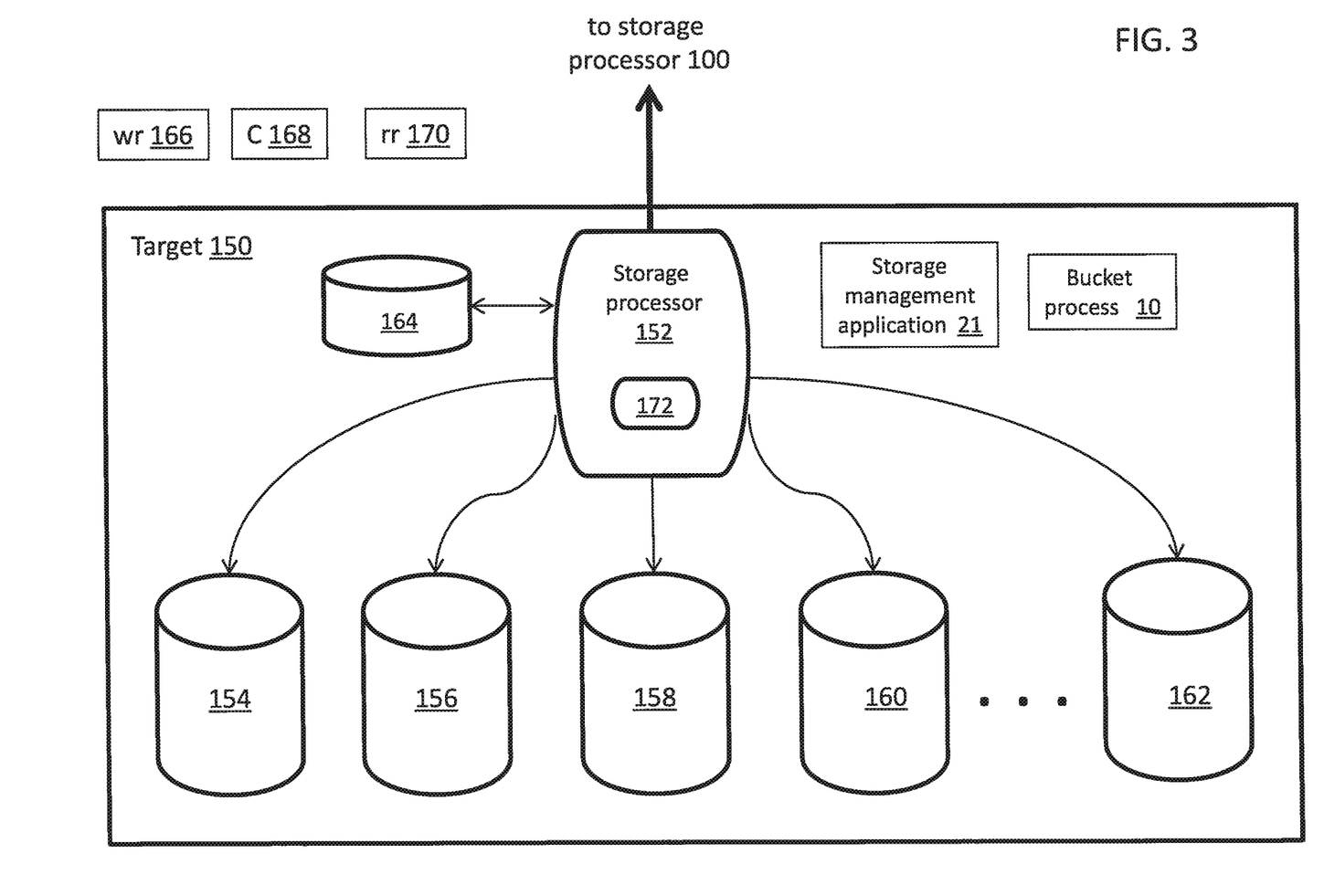
FIG. 3 is an example diagrammatic view of a storage target of FIG. 1 according to one or more embodiments.

Data Storage System:

Referring also to the example embodiments of FIGS. 1-3 (e.g., where computer 12 may be configured as a data storage system), computer 12 may include storage processor 100 and a plurality of storage targets (e.g., storage targets 102, 104, 106, 108, 110). In some embodiments, storage targets 102, 104, 106, 108, 110 may include any of the above-noted storage devices. In some embodiments, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the embodiments described herein.

While in this particular example computer 12 is shown to include five storage targets (e.g., storage targets 102, 104, 106, 108, 110), this is for example purposes only and is not intended limit the embodiments described herein. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some embodiments, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Non-limiting examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

In some embodiments, the hash tables 70 may be stored in one or more of the targets 102, 104, 106, 108, 110 (not shown).

As discussed above, various I/O requests (e.g., I/O request 15) may be generated. For example, these I/O requests may be sent from, e.g., client applications 22, 24, 26, 28 to, e.g., computer 12. Additionally, or alternatively (e.g., when storage processor 100 is configured as an application server or otherwise), these I/O requests may be internally generated within storage processor 100 (e.g., via storage management process 21). Examples of I/O request 15 may include but are not limited to a data write request 116 (e.g., a request that content 118 be written to computer 12) and data read request 120 (e.g., a request that content 118 be read from computer 12).

In some embodiments, during operation of storage processor 100, content 118 to be written to computer 12 may be received and/or processed by the storage processor 100 (e.g., via storage management process 21). Additionally, or alternatively (e.g., when storage processor 100 is configured as an application server or otherwise), content 118 to be written to computer 12 may be internally generated by the storage processor 100 (e.g., via storage management process 21).

As discussed above, the instruction sets and subroutines of the storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or table hardening process 10) may be executed by one or more processors and one or more memory architectures included with data array 112.

In some embodiments, storage processor 100 may include a front end cache memory system 122. Examples of the front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some embodiments, storage processor 100 may initially store content 118 within the front end cache memory system 122. Depending upon the manner in which the front end cache memory system 122 is configured, the storage processor 100 (e.g., via storage management process 21) may immediately write content 118 to data array 112 (e.g., if the front end cache memory system 122 is configured as a write-through cache) or may subsequently write content 118 to data array 112 (e.g., if front end cache memory system 122 is configured as a write-back cache).

In some embodiments, one or more of storage targets 102, 104, 106, 108, 110 may include a backend cache memory system 130. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein the target 150 may be one example of a RAID implementation of, e.g., storage target 102, storage target 104, storage target 106, storage target 108, and/or storage target 110. An example of target 150 may include but is not limited to a VNX™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some embodiments, target 150 may include a storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and is not intended to limit the embodiments described herein, as other configurations are possible. For example, storage devices 154, 156, 158, 160, 162 may be configured as a RAID 3, RAID 4, RAID 5 or RAID 6 array.

While in this particular example the target 150 is shown to include five storage devices (e.g., storage devices 154, 156, 158, 160, 162), this is for example purposes only and is not intended to limit the embodiments described herein. For instance, the actual number of storage devices may be increased or decreased depending upon, e.g., the level of redundancy/performance capacity required.

In some embodiments, one or more of storage devices 154, 156, 158, 160, 162 may be configured to store (e.g., via storage management process 21) coded data, wherein such coded data may allow for the regeneration of data lost or corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

In some embodiments, the hash tables 70 may be stored on one or more of the devices 154, 156, 158, 160, 162.

The manner in which target 150 is implemented may vary depending upon e.g., the level of redundancy/performance/ capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some embodiments, storage target 150 may execute all or a portion of storage management application 21 and the table hardening process 10. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests and/or content (e.g., write request 166, content 168 and read request 170) to, e.g., storage target 150 (which is representative of storage targets 102, 104, 106, 108 and/or 110).

In some embodiments, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Storage systems typically need to harden data structures into non-volatile memory block devices, such as HHD, and SSD. Updates to the data structures hardened on non-volatile memory block devices are implemented in a read-modify-write action. When performing these actions, amortization and write amplification, as well as write latency, need to be taken into consideration in order to ensure processing and storage efficiencies. The embodiments described herein provide a memory efficient, as well as time efficient, method to aggregate updates and execute the aggregated updates for a fixed-size hash table.

A hash table is generally a data structure which implements an associative array abstract data type, a structure that may map keys to values. It uses a hash function to compute from a given key an index into an array of buckets, from which the desired value may be found. A basic requirement is that the hash function should provide a uniform distribution of hash values over the table size. We consider hash collisions resolution (where the hash function generates the same index for more than one key) by chaining entries with the same bucket. A fixed size hash table is a table with fixed number of buckets (N), each one having a fixed maximum number of entries (M). Example: a hash table includes 1,000,000 buckets, each one with maximal 256 entries rounded to the closest native block size, e.g., 4 KB.

Hardening a fixed size hash table includes saving this data structure into nonvolatile memory with a read-modify-write update operation. It is assumed that the system hardens the hash table into a dedicated logical address space over persistent media (referred to as "tier"), i.e.:

---
bucket #0 resides at logical offset 0,
bucket #1 resides at offset bucket_size,
bucket #i resides at offset bucket_size * (i − 1)

---

The execution of a single update on a hardened hash table results in poor amortization and write amplification. Naïve implementations for execution of aggregated updates on a hardened hash table from in-memory only structures are limited by the system memory size and, therefore, cannot be scaled. Approaches in which updates are held in volatile memory are dependent on system capabilities and limitations, as well as prone to heavy losses with respect to updates at system failure. Current approaches are typically general to all types of data and do not presume assumptions over data distribution, which could make aggregation and hardening more efficient.

In embodiments, the updates for a hash table will be hardened in aggregated deltas chunks, of a fixed size. An update will consist of a hash, which serves as key in the hash table, and optionally additional information (e.g., an 'add entry' update which consists of hash and value; a 'remove entry' update which consists only of hash—which will be used to remove entry from hash table by its key). A delta may refer to a difference in the value of an entry in the hash table from an existing value, e.g., something that needs to be updated to a different value. Examples of deltas may include a new entry (new key+value), a change of value, or a deletion of an entry in the table.

Figure 4:
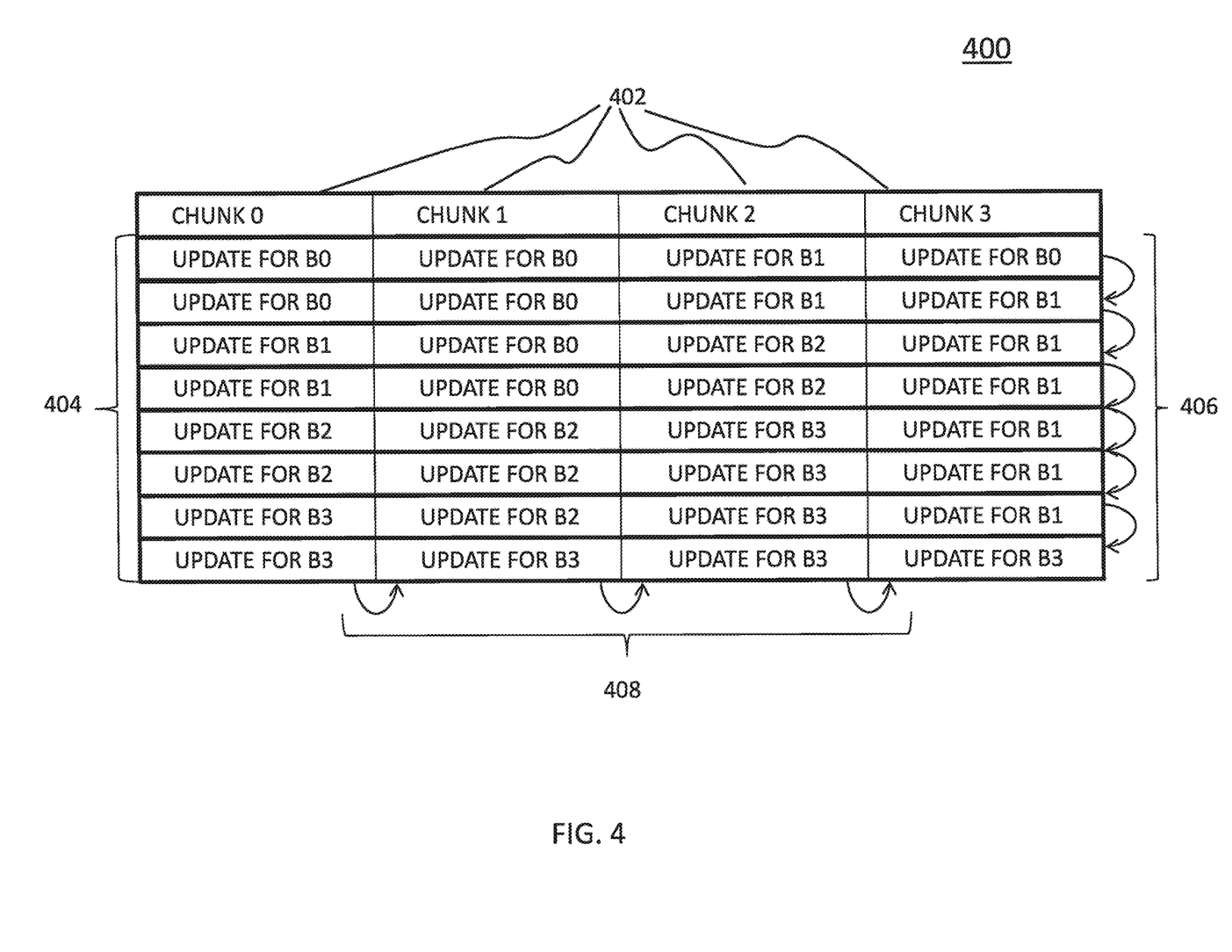
FIG. 4 is an example data structure according to one or more embodiments.

Each delta chunk is sorted by bucket index according to the key. For example, consider a structure which consists of 4 buckets, in which chunk size is defined to be 8, and there are 16 updates to this point. A data structure 400 illustrating this example is shown in FIG. 4. As shown in FIG. 4, a plurality of chunks (collectively referred to as chunks 402) is provided in which each chunk contains 8 entries 404.

Given a system native page size (optimal block for input/outputs (I/O), the chunk size may be defined as a constant fixed multiplication of it. For example, a system native page size is 4 KB, the delta chunk size is 2 MB which consists of 512 pages, and each update is of size 16 bytes, where each 4 KB in a chunk contains a header of 16 bytes in which the update action is indicated.

In this example, each chunk will consist of 130560, sorted by bucket, update entries. Overhead for hardening the aggregated updates is 1 page per 255 updates, meaning its write amplification is negligible.

Hardening of a chunk may be implemented by a simple write operation and may be performed in a sequential log-structured manner.

The chunk size, k, determines the time and space complexity for hardening a single chunk.

To maximize amortization, during bucket hardening, each bucket is written only once with all updates to it from all chunks at once.

Execution of updates will be implemented by sequentially hardening all entries in the structure, which is referred to herein as a hardening cycle, and is defined to be performed on a fixed number of hardened chunks, based on a desired amortization.

By way of example, a hash table that consists of 1,000,000 buckets, each bucket of size 4 KB, system native page size is 4 KB, the chunks are defined as described above, which results in 130560 entries per 2 MB chunk. Since hash tables (and therefore its updates), is uniformly distributed, one can assume that each chunk has 130560/1000000 updates per bucket on average. Therefore, if a hardening cycle is initiated with t=512 chunks, the amortization level will be 67, and with t=1024 is 134.

The amortization level is defined as follows:

$$\text{Amortization} = \frac{t*k}{n}$$

Whereas:
n:=Number of buckets
t:=Number of chunks in cycle
k:=Number of entries in chunk In embodiments, the hardening cycle is performed by iterating simultaneously over all chunks to be used in a cycle.

Since chunks are sorted internally, to perform hardening of a bucket one should only load a single page from each chunk at a given time to aggregate all relevant updates for that bucket from all chunks.

During the hardening process, one can iterate sequentially through a chunk (iterations 406 in FIG. 4) and independently between chunks (iterations 408 in FIG. 4).

Hence, during the entire hash table hardening process, the memory consumption is:
O(native_page_size*t).

Since hardening is done sequentially and in the same order of buckets as of the entries in all chunks, each page in chunk will be read and processed once, and each entry in it will be iterated only once, without any complex lookups, making it time efficient.

A hardening cycle algorithm is provided as follows:

```
For bucket i=0 to n:
    Read bucket i from disk
    For chunk c=0 to t:
        While Iterator_current(c) refers to bucket i:
            Execute update on bucket i
            Iterator_next(c)
    Harden bucket i
while Iterator_next will iterate through entries in a single page of a chunk and will
proceed to the next page.
    iterator_current will simply return the entry we currently pointing to.
```

The above-referenced algorithm provides a memory efficient, as well as time efficient method to execute hardened aggregated updates.

Figure 5:
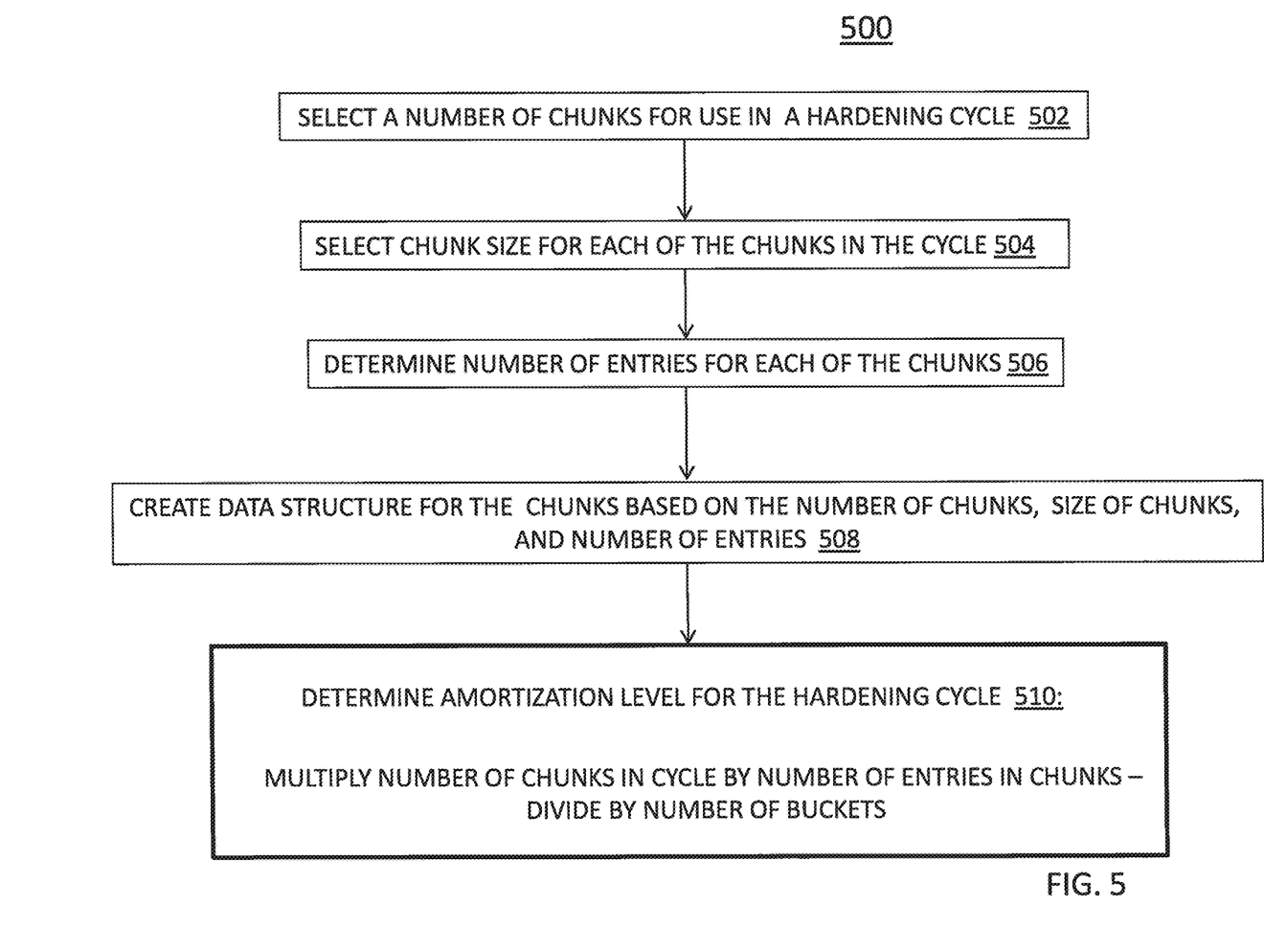
FIG. 5 is a flowchart of a process for generating the data structure of FIG. 4 according to one or more embodiments.

Turning now to FIG. 5, a process 500 for generating a data structure (e.g., structure 400) will now be described. The process 500 may be implemented via the table hardening process 10 described in FIGS. 1-3.

In block 502, the process 500, selects a number of chunks for a hardening cycle. In block 504, the process 500 selects a chunk size for each of the chunks. As described in the examples above, the size of the chunks may be defined as a multiple of a page size where multiple entries correspond to a page. In block 506, the process 500 determines a number of entries in the data structure for the chunks.

In block 508, the process 500 creates a data structure (e.g., structure 400) from the number and size of the chunks, as well as the number of entries.

In block 510, the process 500 determines an amortization level for the hardening cycle. The amortization level may be determined by multiplying the number of chunks by the number of entries, and dividing the product thereof by a number of buckets in the hash table.

Figure 6:
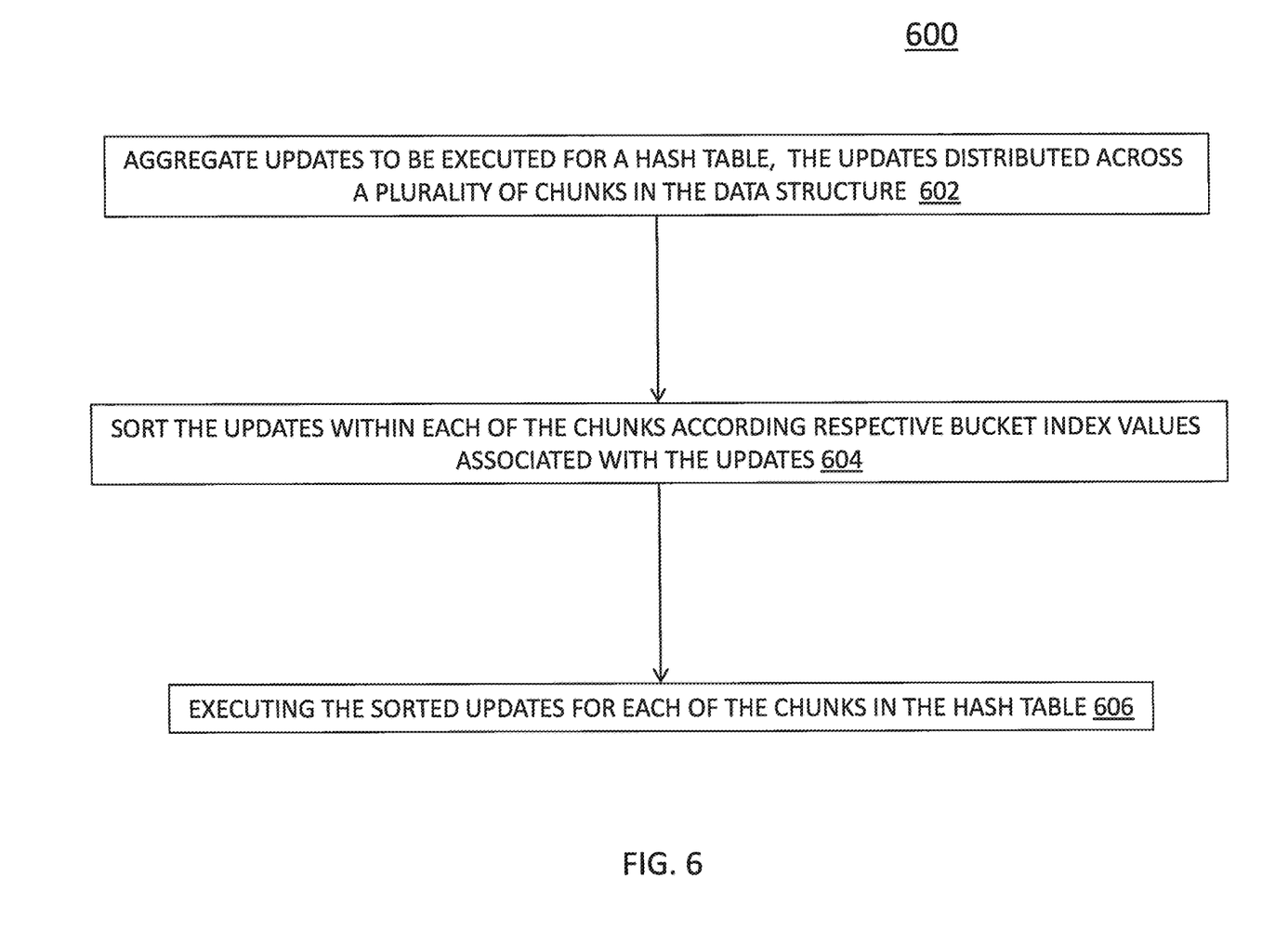
FIG. 6 is a flowchart of a process for executing updates to a hardened hash table according to FIG. 5 and one or more embodiments.

Turning now to FIG. 6, a process 600 for implementing amortized execution of updates for a hash table will now be described. The process 600 may be implemented via the table hardening process 10 described in FIGS. 1-3.

In block 602, the process 600 aggregates, within a data structure, updates to be executed for the hash table. The aggregated updates are distributed across a plurality of chunks in the data structure.

In block 604, the process 600 sorts, within each of the chunks, the updates according to respective bucket index values associated with the updates.

In block 606, the process 600 iteratively executes the sorted updates across each of the chunks in the data structure.

As indicated above, the execution of the updates includes iterating through the sorted updates across the chunks, and hardening the updates to the hash table.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the embodiments has been presented for purposes of illustration and description but is not intended to be exhaustive or limited to the disclosure in the form disclosed. Many modifications, variations, substitutions, and any combinations thereof will be apparent to those of ordinary skill in the art without departing from the scope and spirit of the disclosure. The embodiment(s) were chosen and described in order to explain the principles of the disclosure and the practical application, and to enable others of ordinary skill in the art to understand the disclosure for various embodiment(s) with various modifications and/or any combinations of embodiment(s) as are suited to the particular use contemplated.

Having thus described the disclosure of the present application in detail and by reference to embodiment(s) thereof, it will be apparent that modifications, variations, and any combinations of embodiment(s) (including any modifications, variations, substitutions, and combinations thereof) are possible without departing from the scope of the embodiments defined in the appended claims.

What is claimed is:

1. A method for implementing amortized execution of updates to a hash table having a plurality of buckets, the method comprising:
aggregating, within a data structure, updates to be executed for the hash table, each of the updates being an update to a respective bucket in the hash table, each of the updates being associated with a bucket index corresponding to the update's respective bucket, wherein the aggregated updates are distributed across a plurality of chunks in the data structure;
sorting the updates within each of the chunks in order of the updates' associated bucket indices; and
updating the plurality of buckets in the hash table, wherein each respective one of the buckets is updated at once with all updates to the bucket from all of the plurality of chunks, each of the plurality of buckets being updated by traversing each of the plurality of chunks in the data structure and executing any updates corresponding to the respective bucket that are present in that chunk, such that the traversal of any of the chunks is stopped in response to all updates for the respective bucket in that chunk being executed, when traversing the plurality of chunks includes traversing in parallel chunks in a subset of the plurality of chunks, the subset including fewer than all chunks in the plurality of chunks, the subset including at least two of the plurality of chunks.

2. The method of claim 1, further comprising:
creating the data structure, the creating including selecting a chunk size for each of the plurality of chunks based on a page size of a storage system;
selecting a size of the subset;
determining a number of entries in the data structure for the chunks; and
determining an amortization level for the hardening cycle, the amortization level determined by multiplying the size of the subset by the number of entries, and dividing a product of the multiplying by a number of the buckets in the hash table.

3. The method of claim 2, wherein the chunk size is selected as a multiple of the page size where multiple entries correspond to a page.

4. The method of claim 1, wherein the updates include hash values that serve as keys in the hash table.

5. The method of claim 1, wherein the hash table is a fixed size.

6. A system for implementing amortized execution of updates to a hash table having a plurality of buckets, the system comprising:
a memory having computer-executable instructions; and
a processor for executing the computer-executable instructions, the computer-executable instructions when executed by the processor cause the processor to perform operations, comprising:
aggregating, within a data structure, updates to be executed for the hash table, each of the updates being an update to a respective bucket in the hash table, each of the updates being associated with a bucket index corresponding to the update's respective bucket, wherein the aggregated updates are distributed across a plurality of chunks in the data structure;
sorting the updates within each of the chunks in order of the updates' associated bucket indices; and
updating the plurality of buckets in the hash table, wherein each respective one of the buckets is updated at once with all updates to the bucket from all of the plurality of chunks, each of the plurality of buckets being updated by traversing each of the plurality of chunks in the data structure and executing any updates corresponding to the respective bucket that are present in that chunk, such that the traversal of any of the chunks is stopped in response to all updates for the respective bucket in that chunk being executed, wherein traversing the plurality of chunks includes traversing in parallel chunks in a subset of the plurality of chunks, the subset including fewer than all chunks in the plurality of chunks, the subset including at least two of the plurality of chunks.

7. The system of claim 6, wherein the operations further comprise:
creating the data structure, the creating including selecting a chunk size for each of the plurality of chunks based on a page size of a storage system;
selecting a size of the subset;
determining a number of entries in the data structure for the chunks; and
determining an amortization level for the hardening cycle, the amortization level determined by multiplying the size of the subset by the number of entries, and dividing a product of the multiplying by a number of the buckets in the hash table.

8. The system of claim 7, wherein the chunk size is selected as a multiple of the page size where multiple entries correspond to a page.

9. The system of claim 6, wherein the updates include hash values that serve as keys in the hash table.

10. The system of claim 6, wherein the hash table is a fixed size.

11. A computer program product for implementing amortized execution of updates to a hash table having a plurality of buckets, the computer program product embodied on a non-transitory computer readable medium, the computer program product including instructions that, when executed by a computer, cause the computer to perform operations, comprising:
aggregating, within a data structure, updates to be executed for the hash table, each of the updates being an update to a respective bucket in the hash table, each of the updates being associated with a bucket index corresponding to the update's respective bucket, wherein the aggregated updates are distributed across a plurality of chunks in the data structure;
sorting the updates within each of the chunks in order of the updates' associated bucket indices; and
updating the plurality of buckets in the hash table, wherein each respective one of the buckets is updated at once with all updates to the bucket from all of the plurality of chunks, each of the plurality of buckets being updated by traversing each of the plurality of chunks in the data structure and executing any updates corresponding to the respective bucket that are present in that chunk, such that the traversal of any of the chunks is stopped in response to all updates for the respective bucket in that chunk being executed, wherein traversing the plurality of chunks includes traversing in parallel chunks in a subset of the plurality of chunks, the subset including fewer than all chunks in the plurality of chunks, the subset including at least two of the plurality of chunks.

12. The computer program product of claim 11, wherein the operations further comprise:
creating the data structure, the creating including selecting a chunk size for each of the plurality of chunks based on a page size of a storage system;
selecting a size of the subset;
determining a number of entries in the data structure for the chunks; and
determining an amortization level for the hardening cycle, the amortization level determined by multiplying the size of the subset by the number of entries, and dividing a product of the multiplying by a number of the buckets in the hash table.

13. The computer program product of claim 12, wherein the chunk size is selected as a multiple of the page size where multiple entries correspond to a page.

14. The computer program product of claim 11, wherein the updates include hash values that serve as keys in the hash table.

* * * * *